(12) United States Patent
Koustubhan

(10) Patent No.: US 12,515,801 B2
(45) Date of Patent: Jan. 6, 2026

(54) MODULAR BACKREST STRUCTURE FOR AIRCRAFT SEATS

(71) Applicant: B/E Aerospace, Inc., Winston-Salem, NC (US)

(72) Inventor: Arjun Koustubhan, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 166 days.

(21) Appl. No.: 18/216,878

(22) Filed: Jun. 30, 2023

(65) Prior Publication Data

US 2024/0336362 A1 Oct. 10, 2024

(30) Foreign Application Priority Data

Apr. 5, 2023 (IN) .............................. 202311025743

(51) Int. Cl.
*B60N 2/68* (2006.01)
*B64D 11/06* (2006.01)

(52) U.S. Cl.
CPC ............ *B64D 11/0693* (2013.01); *B60N 2/68* (2013.01); *B60N 2/686* (2013.01); *B64D 11/0642* (2014.12); *B64D 11/0649* (2014.12)

(58) Field of Classification Search
CPC ... B60N 2/68; B60N 2/686; B60N 2002/0288
See application file for complete search history.

(56) References Cited

U.S. PATENT DOCUMENTS

| | | | |
|---|---|---|---|
| 5,735,572 A | 4/1998 | Clark et al. | |
| 5,868,472 A | 2/1999 | Grilliot et al. | |
| 6,644,738 B2 | 11/2003 | Williamson | |
| 8,539,661 B2 | 9/2013 | Gross et al. | |
| 9,108,554 B2 | 8/2015 | Gross et al. | |
| 9,555,891 B2 | 1/2017 | Fullerton et al. | |
| 9,663,230 B2 | 5/2017 | Marini | |
| 9,854,912 B2 | 1/2018 | Iacobucci | |
| 10,093,423 B2 | 10/2018 | Uriu et al. | |
| 10,406,953 B2 * | 9/2019 | Tokumoto | ................ B60N 2/64 |
| 10,899,454 B2 | 1/2021 | Lara et al. | |
| 11,279,488 B2 | 3/2022 | D'Alessio et al. | |
| 11,468,634 B2 | 10/2022 | Zhang et al. | |
| 2005/0121963 A1 | 6/2005 | Williamson et al. | |

(Continued)

FOREIGN PATENT DOCUMENTS

| | | | | |
|---|---|---|---|---|
| CN | 206031145 U | * | 3/2017 | ........... B21D 35/001 |
| CN | 209795275 U | | 12/2019 | |

(Continued)

OTHER PUBLICATIONS

European Patent Office, Extended European Search Report received in EP Application No. 24168541.1, Aug. 27, 2024, 7 pages.

*Primary Examiner* — Timothy J Brindley

(74) *Attorney, Agent, or Firm* — Suiter Swantz IP

(57) ABSTRACT

A modular backrest structure. The backrest includes a back shell. The back shell is changed to customize the aesthetic of the seat. The backrest includes a beam. The back shell is coupled to the beam and adapters. The beam and adapters are configurable to multiple widths. The multiple widths of the allow for changing the back shell without changing the beam and the adapters. The beam and adapters provide a standardized attachment scheme to eliminate variations arising out of the different back shells.

13 Claims, 14 Drawing Sheets

(56) References Cited

U.S. PATENT DOCUMENTS

| | | | |
|---|---|---|---|
| 2005/0242634 A1 | 11/2005 | Serber | |
| 2013/0082504 A1 | 4/2013 | Archambault | |
| 2013/0127227 A1 | 5/2013 | Oleson | |
| 2018/0279791 A1* | 10/2018 | Iwakata | B60N 2/688 |
| 2019/0359102 A1* | 11/2019 | Oshima | B60N 2/682 |
| 2020/0407067 A1* | 12/2020 | Koustubhan | B64D 11/064 |
| 2021/0061474 A1 | 3/2021 | Dowty et al. | |
| 2022/0340284 A1 | 10/2022 | Koustubhan et al. | |
| 2023/0025571 A1 | 1/2023 | Jussli et al. | |
| 2023/0055017 A1* | 2/2023 | Steury | B60N 2/682 |

FOREIGN PATENT DOCUMENTS

| | | | | |
|---|---|---|---|---|
| CN | 113734008 A | * | 12/2021 | B60N 2/64 |
| CN | 117246206 A | * | 12/2023 | B60N 2/64 |
| DE | 102006030932 B4 | * | 12/2008 | B60N 2/242 |
| DE | 102017125535 A1 | * | 5/2018 | B60N 2/58 |
| DE | 102021209728 A1 | * | 3/2023 | B60N 2/06 |
| EP | 2186671 A1 | * | 5/2010 | B60N 2/22 |
| EP | 2583862 B1 | | 5/2016 | |
| EP | 3643563 A1 | * | 4/2020 | B60N 2/015 |
| FR | 2985468 A1 | * | 7/2013 | B60N 2/7005 |
| WO | 2021123324 A1 | | 6/2021 | |

* cited by examiner

104a

MODULAR BACKREST STRUCTURE FOR AIRCRAFT SEATS

CROSS-REFERENCE TO RELATED APPLICATIONS

The present application claims the benefit of India Provisional Patent Application 202311025743, filed on Apr. 5, 2023, titled "MODULAR BACKREST STRUCTURE FOR AIRCRAFT SEATS", naming Arjun Koustubhan as inventor, with a Digital Access Service (DAS) code of F0B8, which is incorporated herein by reference in the entirety.

TECHNICAL FIELD

The present invention generally relates to aircraft seats and more specifically to modular backrest of the aircraft seats.

BACKGROUND

Aircraft seats include backrest assemblies. The backrest assemblies include designs which are heavily influenced by a size of the seat and by aesthetic considerations. Change requests may result in a change of the aircraft seats. The backrest assemblies, particular in executive aircraft seats, commonly are reconfigured when the size of the seat is changed. The reconfiguration of the backrest assembly requires recertification of the backrest assembly to various seat certification requirements. The recertification process is timely and may impact the turnaround time of the redesigned aircraft seats. Therefore, it would be advantageous to provide a device, system, and method that cures the shortcomings described above.

SUMMARY

A passenger seat is disclosed, in accordance with one or more embodiments. In some embodiments, the passenger seat includes a headrest. In some embodiments, the passenger seat includes a seat pan. In some embodiments, the passenger seat includes a seat back. In some embodiments, the seat back includes a first beam and a second beam. In some embodiments, the seat back includes a headrest adapter. The headrest adapter spans between and couples the first beam to the second beam. The headrest adapter is detachably attached to the first beam and to the second beam. In some embodiments, the seat back includes a torque adapter. The torque adapter spans between and couples the first beam to the second beam. The torque adapter is detachably attached to the first beam and to the second beam. In some embodiments, the seat back includes a back shell. The back shell is detachably attached to the headrest adapter and to the torque adapter. In some embodiments, the seat back includes a cover plate. The cover plate is detachably attached to the first beam, the second beam, the headrest adapter, and a torque adapter.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
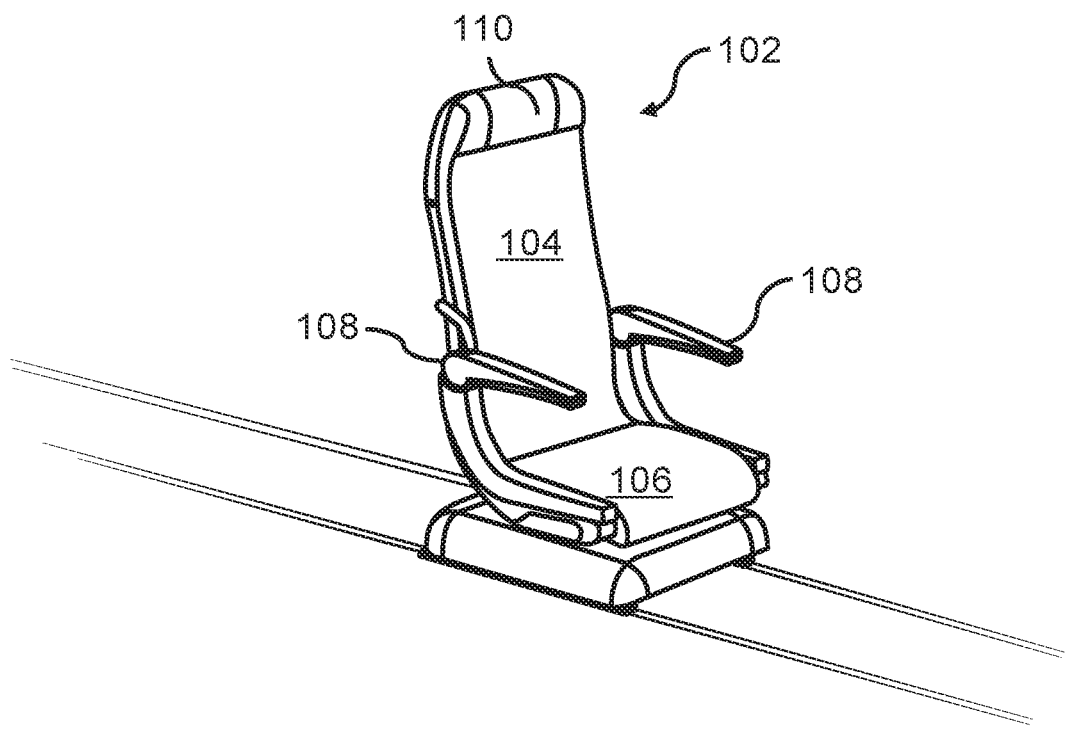
FIG. 1 depicts a perspective view of an aircraft including a passenger seat, in accordance with one or more embodiments of the present disclosure.
Figure 2A:
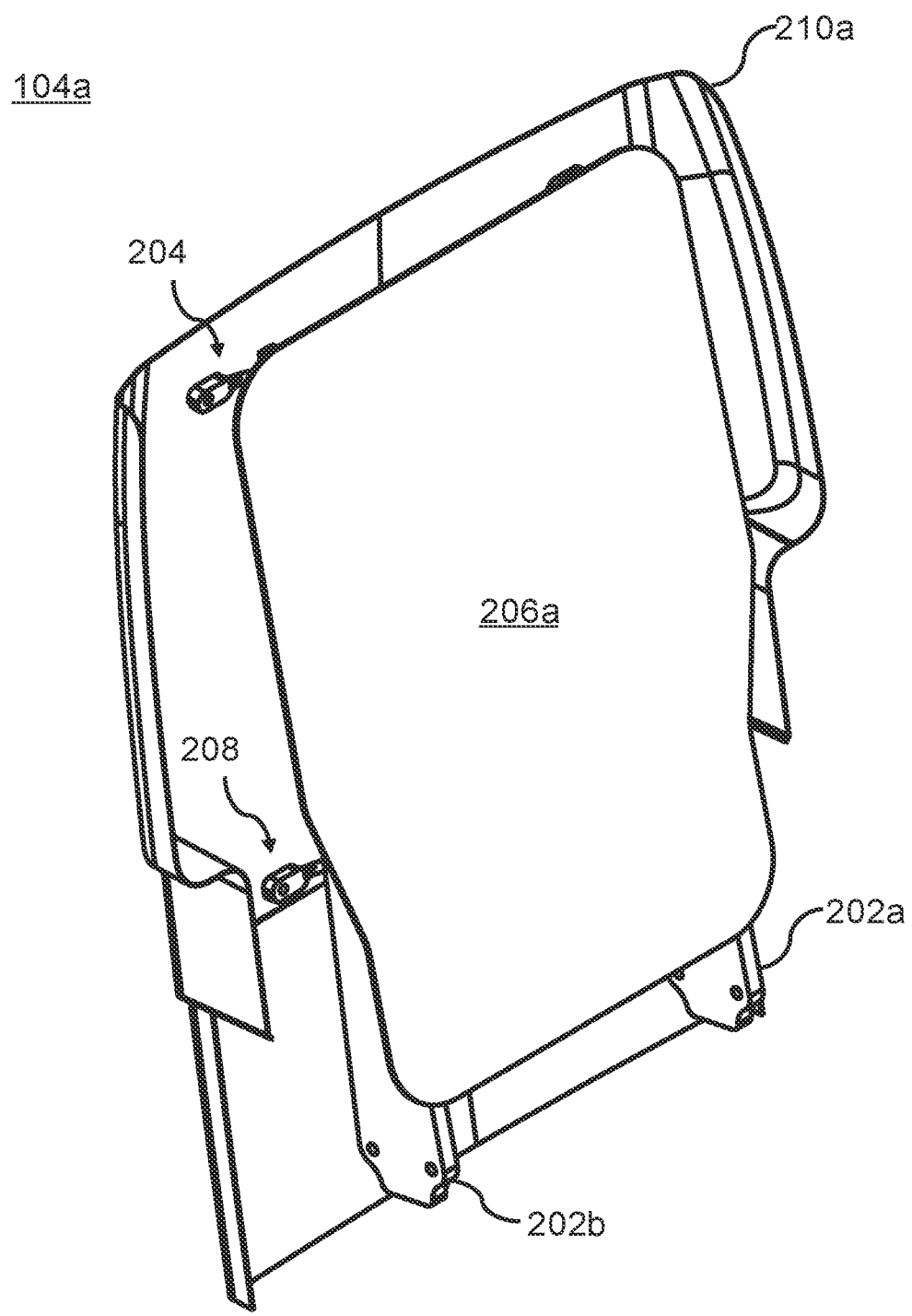
FIG. 2A depicts a front perspective view of a seat back of a passenger seat, in accordance with one or more embodiments of the present disclosure.
Figure 2B:
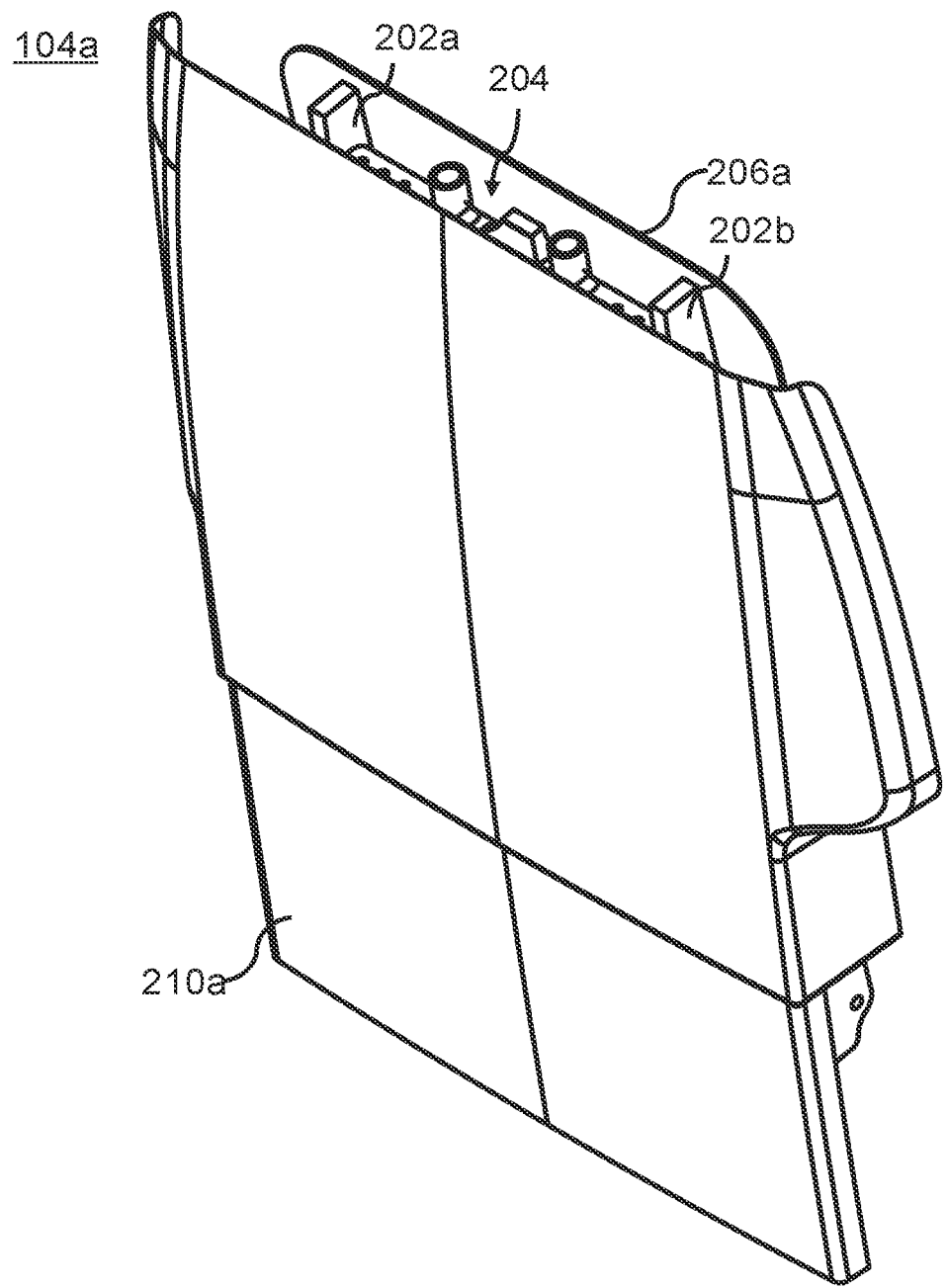
FIG. 2B depicts a rear perspective view of a seat back of a passenger seat, in accordance with one or more embodiments of the present disclosure.
Figure 2C:
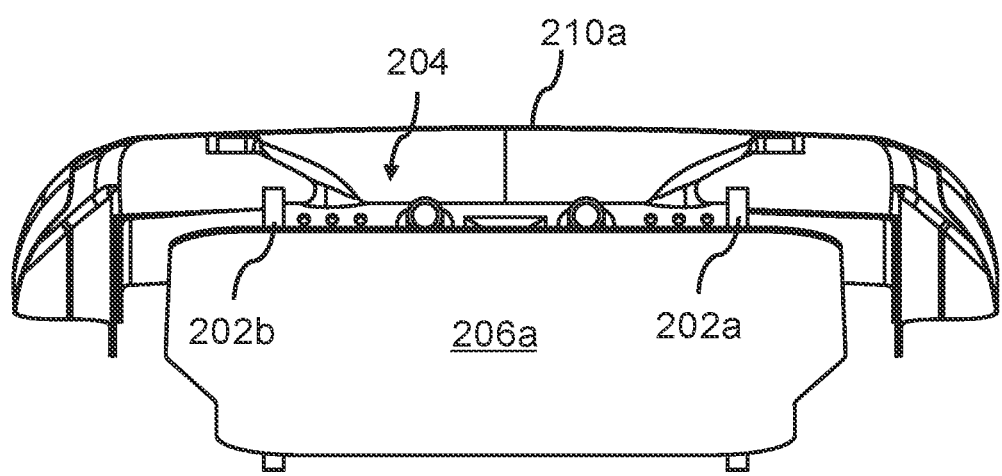
FIG. 2C depicts a top view of a seat back of a passenger seat, in accordance with one or more embodiments of the present disclosure.
Figure 2D:
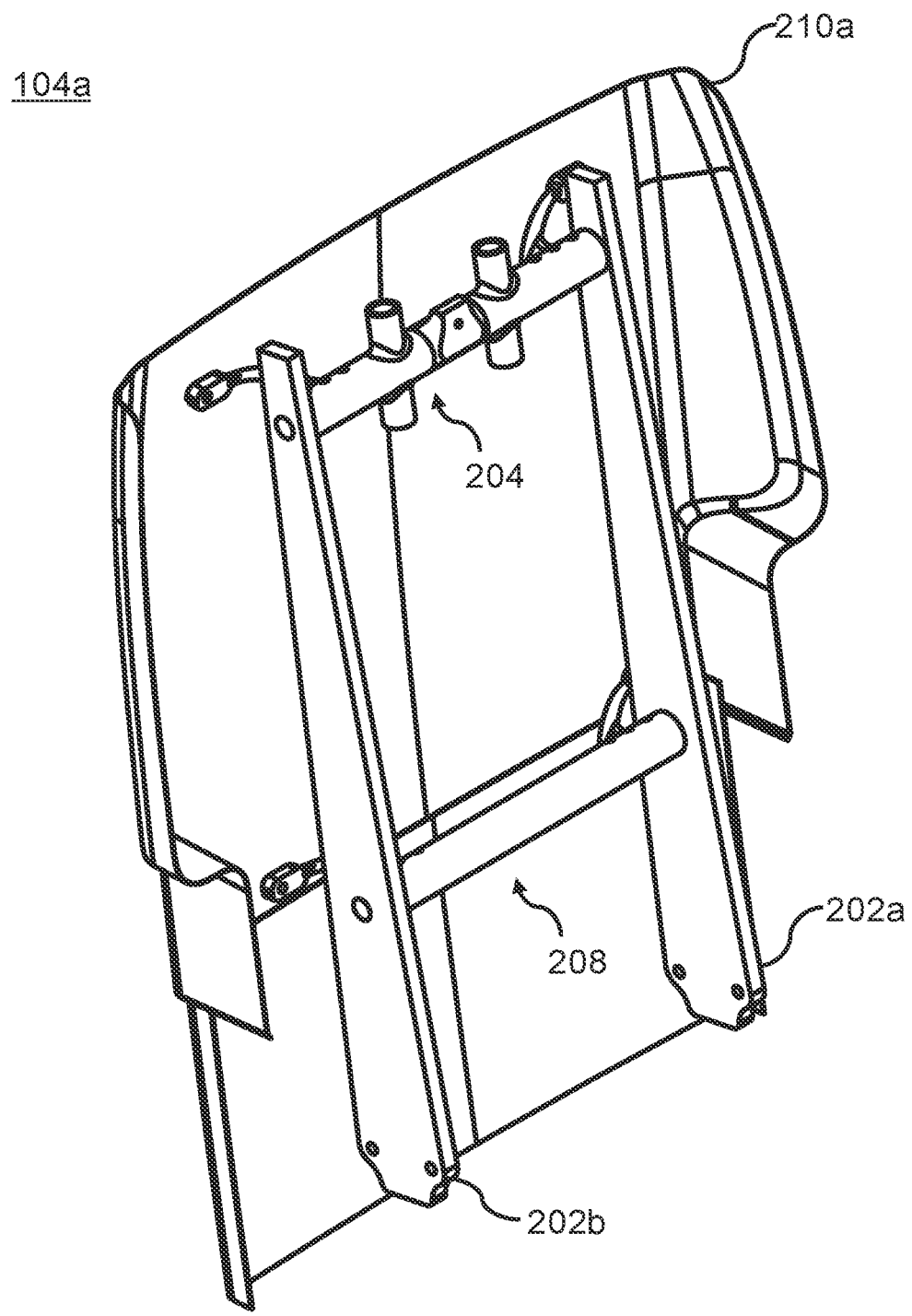
FIG. 2D depicts a front perspective view of a seat back of a passenger seat with a cover plate which is hidden to illustrate an adapter coupling to a back shell, in accordance with one or more embodiments of the present disclosure.
Figure 2E:
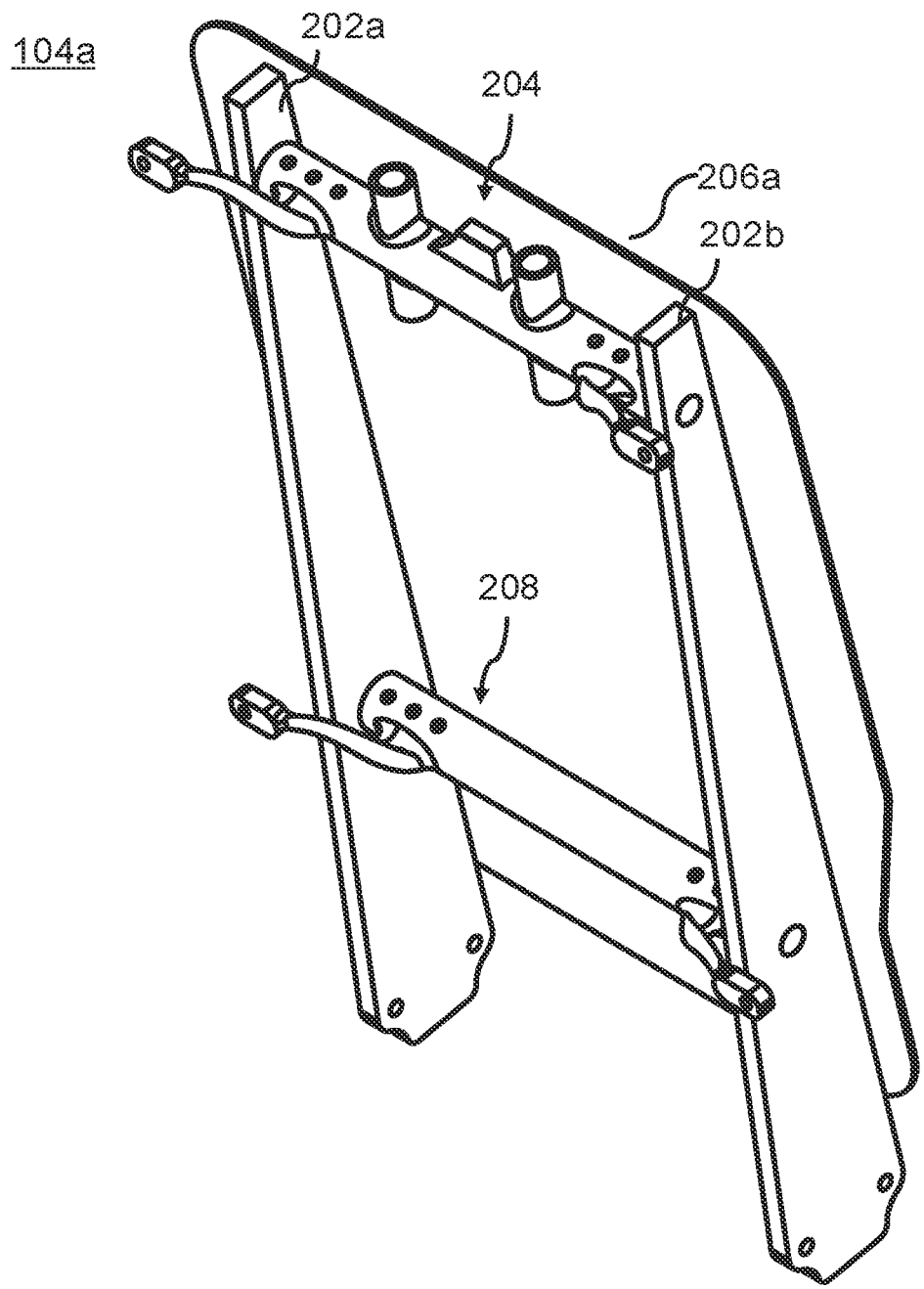
FIG. 2E depicts a rear perspective view of a seat back of a passenger seat with a back shell which is hidden to illustrate an adapter coupling to a cover plate, in accordance with one or more embodiments of the present disclosure.
Figure 2F:
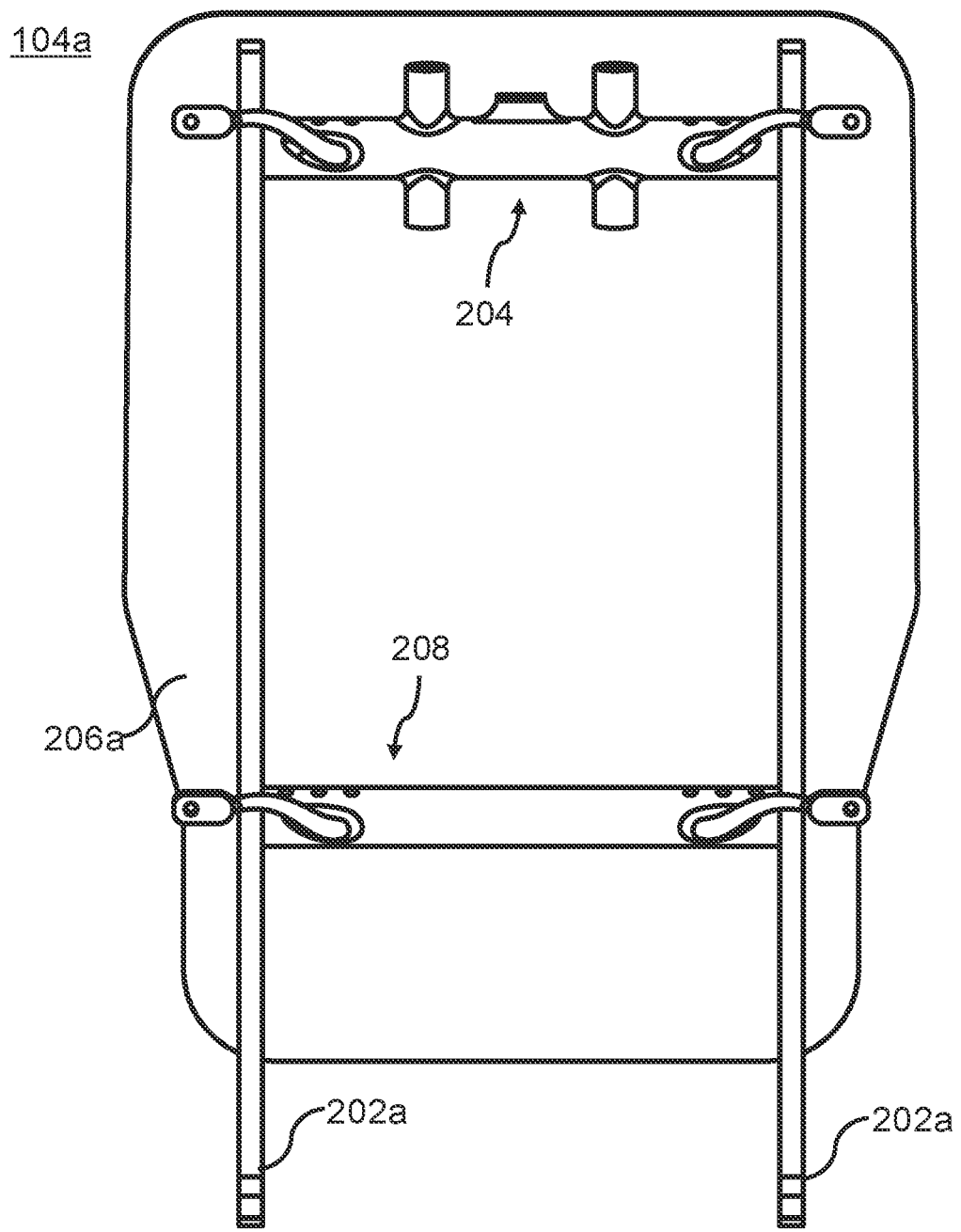
FIG. 2F depicts a rear view of a seat back of a passenger seat with a back shell which is hidden to illustrate an adapter coupling to a cover plate, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to an aircraft seat. The seat includes modular backrest assembly. The modular backrest assembly can be configured to multiple widths. The modular backrest assembly eliminates having different backrest assemblies for different seat types/families. The modular backrest assembly may provide a number of benefits, such as, but not limited to, allowing designers to rapidly build product families, make last minute change requests, provides modularity for use in different seat orientations (e.g., forward or aft facing), is adjustable for different seat sizes, and provides a standardized attachment schemes eliminate variables driven by industrial design. The design of the backrest assembly may be influenced not only by the size of the seat itself (width of backrest, width between arms, features/options selected, etc.) but also by the industrial design/aesthetics.

The modular backrest structure includes a back shell. The back shell may be changed to customize the aesthetic of the seat. The modular backrest structure includes a backrest beam. The back shell is coupled to the backrest beam. The backrest beam can be configured to multiple widths. The multiple widths of the backrest beam allow for changing the back shell without changing the backrest beam. The backrest beam provides a standardized attachment scheme to eliminate variations arising out of the different back shells.

U.S. Patent Publication No. 2022/0340284, titled "Vertical adjustment system for an aircraft seat", filed on Jun. 3, 2021; U.S. Patent Publication No. 2020/0407067, titled "Aircraft passenger seat with in-flight rocking motion", filed on Jun. 25, 2019; are each incorporated herein by reference in the entirety.

Referring now to FIG. 1, an aircraft 100 that includes a passenger seat 102 is described, in accordance with one or more embodiments of the present disclosure. The passenger seat may also be referred to as an aircraft. The passenger seat 102 may include any type of passenger seat within the aircraft 100. For example, the passenger seat 102 may include, but is not limited to, an economy-class passenger seat, a business-class passenger seat, a first-class passenger seat, an executive-class passenger seat, and the like. The passenger seat 102 is merely illustrative of the various embodiments of the present disclosure and are not intended to be limiting.

The passenger seat 102 may include a seat back 104 and a seat pan 106. The passenger seat 102 is coupled to a floor (e.g., by a track) of the aircraft 100. In embodiments, the seat back 104 and the seat pan 106 may be separate structures and/or may include one or more shared components. For example, the seat back 104 and the seat pan 106 can have a shared cushion or covering. The seat back 104 may also be configured to move relative to the seat pan 106. For example, the seat back 104 can be configured to transition between upright and reclining positions. In embodiments, the seat pan 106 can also be actuated such that the passenger seat 102 may be configurable between an upright position and a bed position (i.e., a lie-flat position), although this is not intended to be a limitation of the present disclosure. The passenger seat 102 may also include one or more arm rests 108. The arm rests 108 may be pivotally mounted to the passenger seat 102 by a pivot joint or another kinematic coupling. In embodiments, the passenger seat 102 may include a headrest 110. The headrest 110 may be coupled to the seat back 104. The headrest 110 may be vertically adjustable relative to the seat back 104. In embodiments, the passenger seat 102 may include a foot rest. The foot rest may be coupled to the seat pan 106.

Referring generally to FIGS. 2A-3C, the seat back 104 is described, in accordance with one or more embodiments of the present disclosure. The seat back 104 may also be referred to as a backrest or a backrest assembly. The seat back 104 may include one or more components, such as, but not limited to, beams 202, headrest adapter 204, cover plate 206, torque adapter 208, back shell 210, and the like.

The seat back 104 includes beams 202. The beams 202 may also be referred to as backrest beams. The beams 202 may include a first beam 202a and a second beam 202b. The first beam 202a may also be referred to as a right-hand beam. The second beam 202b may also be referred to as a left-hand beam. Although the beams 202 are described as being left-hand and right-hand beams, this is not intended as a limitation of the present disclosure. It is contemplated that the beams 202 may be reconfigurable between being the right-hand beam and the left-hand beam by rotating the beams 202 one-hundred and eighty degrees about a vertical axis of the beams. It is further contemplated that the beams 202 may not be reconfigurable between being the right-hand beam and the left-hand beam.

The beams 202 may be pivotably coupled to one or more pivot joints (not depicted) of the passenger seat 102. The beams 202 may pivot about the pivot joints. Pivotable rotation of the beams 202 may be carried throughout the seat back 104. The beam 202a and the beam 202b cause rotation of the seat back 104 about the pivot point. For example, the pivotable rotation of the beams 202 may cause the headrest adapter 204, cover plate 206, torque adapter 208, and the back shell 210 to rotate. The beam 202a and the beam 202b are aligned in a vertical orientation when the passenger seat 102 is in an upright position. The seat back 104 may be configurable between the positions described above by the rotation of the various components. The beams 202 may be further understood with reference to FIG. 4.

The seat back 104 includes headrest adapter 204. The headrest adapter 204 spans between and couples the beam 202a to the beam 202b. The headrest adapter 204 is detachably attached to the beam 202a and to the beam 202b. For example, the headrest adapter 204 may be detachably attached to the beams 202 by one or more fasteners (not depicted). The headrest adapter 204 adapts the seat back 104 to couple with the headrest 110.

The seat back 104 includes cover plate 206. The cover plate 206 may also be referred to as a backrest cover plate. The cover plate 206 is detachably attached to the beam 202a, the beam 202b, and the headrest adapter 204. The cover plate 206 may be detachably attached to the beam 202a, the beam 202b, and the headrest adapter 204 by one or more fasteners (not depicted).

In embodiments, the seat back 104 may also include a seat back cushion (not depicted). The seat back cushion may also be referred to as a backrest cushion. The seat back cushion may be attached to the cover plate 206. The seat back cushion may provide padding to a passenger sitting on the passenger seat. A portion of the weight of the passenger may be borne through the seat back 104 by the cushion, to the cover plate 206, and to the beams 202. The weight may then be borne through the beams 202 through a pivot joint to one or more components of the passenger seat 102. For example, the weight may be borne through the pivot joint to a base of the passenger seat 102. The base may then bear the weight into the floor (e.g., by the track) of the aircraft 100. The backrest cushion, which is also driven by aesthetics/industrial design, needs a support behind the cushion. The cover plate 206 may provide an underlying load-bearing structure for the cushion. The cover plate 206 may be detached and changed for coupling to different shapes of the cushions.

The seat back 104 also includes torque adapter 208. The torque adapter 208 spans between and couples the beam 202a to the beam 202b. The torque adapter is detachably attached to the beam 202a and to the beam 202b. For example, the headrest adapter 204 may be detachably attached to the beams 202 by one or more fasteners (not depicted). The torque adapter 208 reduces flexure in the seat back 104.

In embodiments, the beams 202, the headrest adapter 204, the cover plate 206, and the torque adapter 208 may be considered structural frame members of the seat back 104. For example, the beams 202, the headrest adapter 204, the cover plate 206, and the torque adapter 208 may bear a weight of a passenger sitting on the passenger seat 102. In embodiments, the back shell 210 may be considered a non-structural frame member of the seat back 104. For example, the back shell 210 may not bear a weight of a passenger sitting on the passenger seat 102.

The seat back 104 also includes the back shell 210. The back shell 210 is a covering on the aft of the seat back 104. For example, the back shell 210 may cover an aft of the beams 202, an aft of the headrest adapter 204 and an aft of the torque adapter 208. The back shell 210 is detachably attached to the headrest adapter 204 and to the torque adapter 208. The back shell may be detachably attached to the headrest adapter 204 and to the torque adapter 208 by one or more fasteners (not depicted). The back shell 210 may include a shape. The shape of the back shell 210 may vary, and is not intended to be limited to the shape depicted. The shape of the back shell 210 may be based on a width between the armrests 108, and the like. The variance in the shape of the back shell 210 may provide a challenge when attaching the back shell 210 to structural members of the seat back 104.

In embodiments, the headrest adapter 204 may be disposed above the torque adapter 208. For example, the headrest adapter 204 is disposed above the torque adapter 208 when the passenger seat 102 is in an upright position.

In embodiments, the seat back 104 may also include a dress cover (not depicted). The dress cover may cover one or more portions of the seat back 104, such as the seat back cushion. The dress cover may include various aesthetic designs. In embodiments, the seat back 104 may further include various other components which are not depicted in the interest of clarity. For example, the seat back 104 may include, but is not limited to, electronic control units (ECUs), air bladders, seat belt assemblies, cabling, and the like.

In embodiments, the back shell 210 may be changed. For example, the back shell 210 may be changed to change an aesthetic of the passenger seat 102. Advantageously, the back shell 210 may be changed without having to change the headrest adapter 204 and/or torque adapter 208. In embodiments, the seat back 104 may be considered a modular backrest assembly. The modular backrest assembly may accommodate changes to the backrest assembly, consolidate a number of parts, and the like. The seat back 104 may include a standardized attachment scheme for attaching back shells 210 having different shapes. The standardized attachment scheme may eliminate variations arising out of the industrial design aspects that drive the back shell 210. For example, the headrest adapter 204 and the torque adapter 208 have the standardized attachment scheme.

In embodiments, the seat back 104 may be adjusted to one or more widths. For example, the seat back 104 may be adjusted to a wide setting or a narrow setting. In embodiments, the beams 202, the headrest adapter 204, and the torque adapter 208 may be reconfigurable. For example, a width between the beams 202 may be reconfigurable by adjusting a location in which the headrest adapter 204 and the torque adapter 208 couple to the beams 202. In this regard, the seat back 104 includes an adjustable width. The adjustably width may allow the seat back 104 to replace the cover plate 206 and/or the back shell 210 with different shapes. Advantageously, the beams 202, the headrest adapter 204, and the torque adapter 208 may be reconfigured without a mandatory re-certification of the seat back 104. Similarly, the cover plate 206 and/or the back shell 210 may be replaced without a mandatory re-certification of the seat back 104. The widths of the seat back 104 may be further understood with reference to FIGS. 2A-2F and with reference to FIGS. 3A-3C. Holes of the beams 202 are aligned with holes of the headrest adapter 204 when adjusting the width. Similarly, holes of the beams 202 are aligned with holes of the torque adapter 208 when adjusting the width.

Referring now in particular to FIGS. 2A-2F, a seat back 104a is described, in accordance with one or more embodiments of the present disclosure. The seat back 104a may be an example of the seat back 104 in a minimum width configuration. The seat back 104a may include a cover plate 206a and back shell 210a.

Figure 3A:
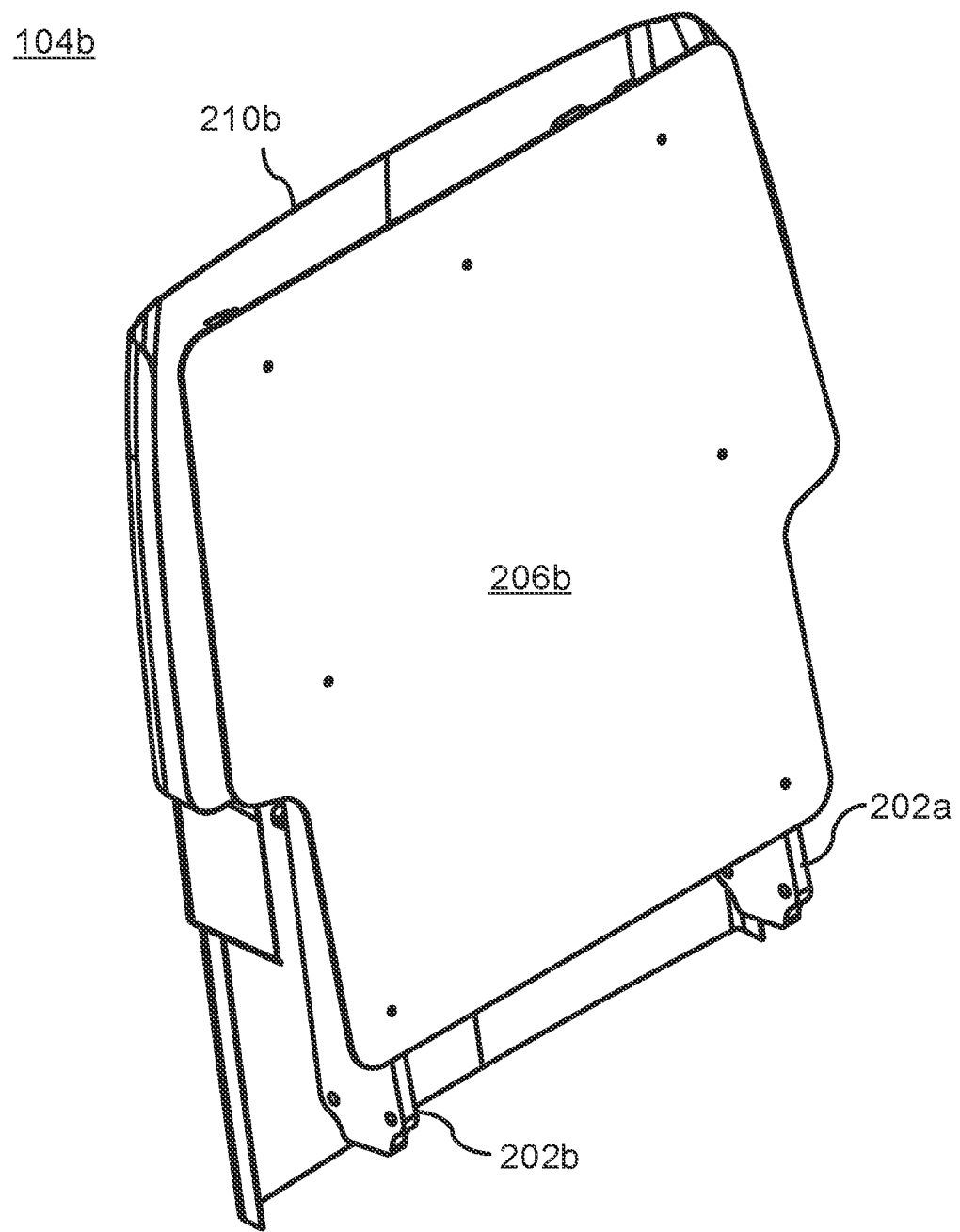
FIG. 3A depicts a front perspective view of a seat back of a passenger seat, in accordance with one or more embodiments of the present disclosure.
Figure 3B:
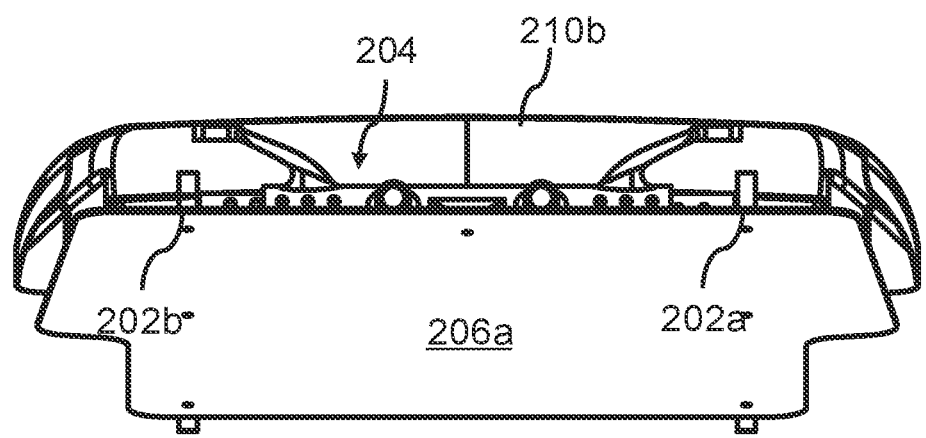
FIG. 3B depicts a top view of a seat back of a passenger seat, in accordance with one or more embodiments of the present disclosure.
Figure 3C:
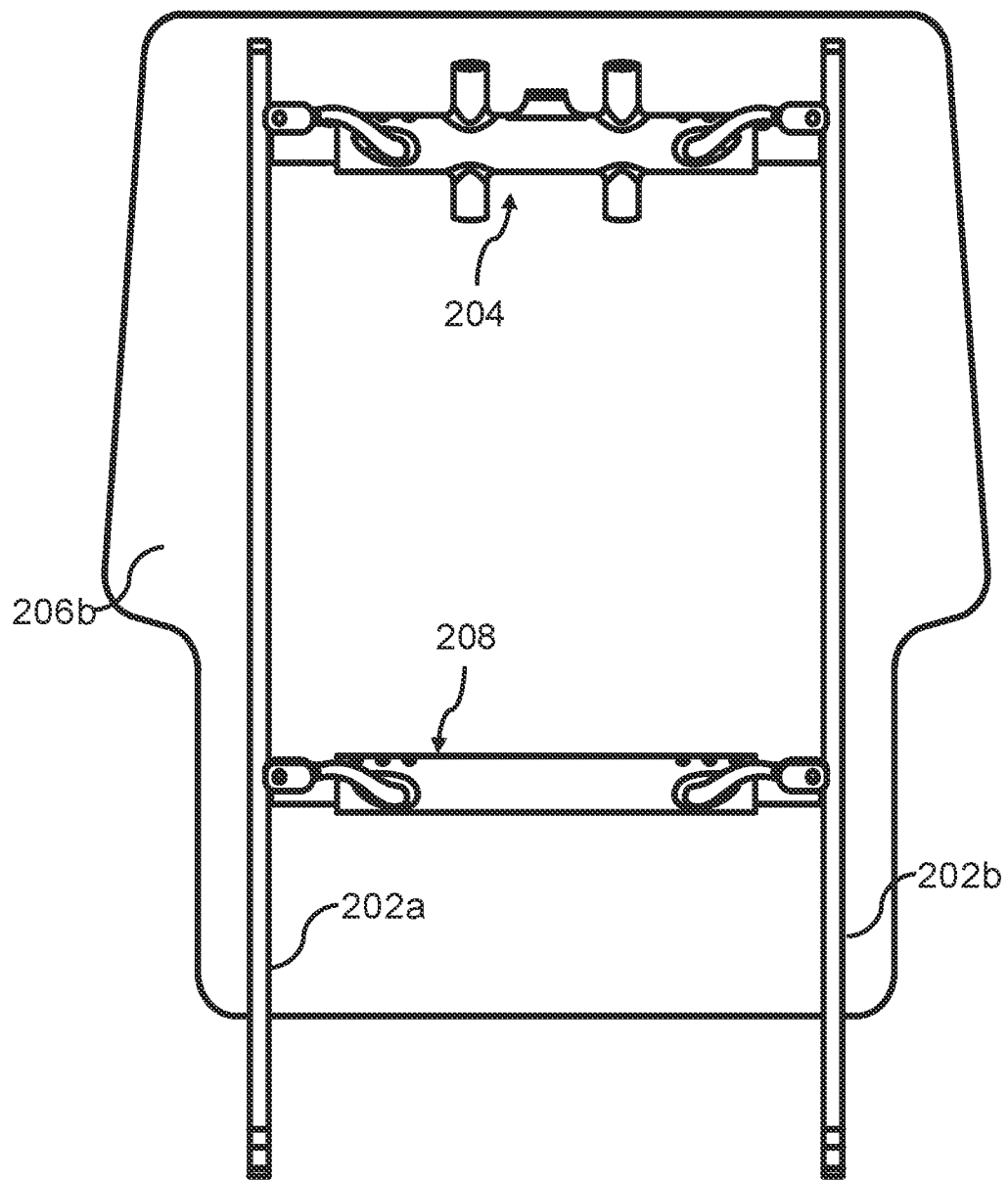
FIG. 3C depicts a rear view of a seat back of a passenger seat with a back shell which is hidden to illustrate an adapter coupling to a cover plate, in accordance with one or more embodiments of the present disclosure.

Referring now in particular to FIGS. 3A-3C, a seat back 104b is described, in accordance with one or more embodiments of the present disclosure. The seat back 104b may be an example of the seat back 104 in a maximum width configuration. The seat back 104a may include a cover plate 206b and back shell 210b. The cover plate 206b and the back shell 210b have replaced the cover plate 206a and the back shell 210a.

Figure 4:
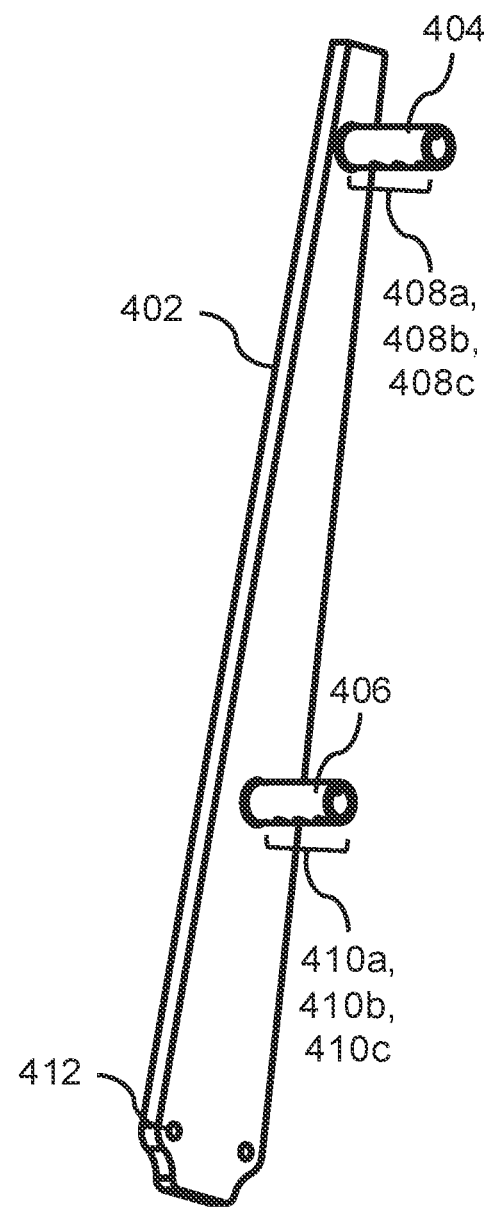
FIG. 4 depicts a perspective view of a beam of a seat back, in accordance with one or more embodiments of the present disclosure.

Referring now to FIG. 4, the beams 202 are described, in accordance with one or more embodiments of the present disclosure. The beams 202 may include, but are not limited to, a side member 402, an upper tubular member 404, and a lower tubular member 406.

The beams 202 may include the side member 402. The side member 402 may also be referred to as a vertical member. For example, the side members 402 may be aligned in a vertical orientation when the passenger seat 102 is in an upright position. The side member 402 may pivotably couple the seat back 104. For example, the side member 402 may include one or more holes 412 for pivotably coupling the seat back 104.

The beams 202 may also include the upper tubular member 404. The upper tubular member 404 extends from the beam 202. The upper tubular member 404 may form a socket connection with the headrest adapter 204. For example, the upper tubular member 404 may be received within and detachably attached to the headrest adapter 204.

The beams 202 may also include the lower tubular member 406. The lower tubular member 406 may be disposed below the upper tubular member 406 in the passenger seat 102. The lower tubular member 406 extends from the beam 202. The lower tubular member 406 may form a socket connection with the torque adapter 208. For example, the lower tubular member 406 may be received within and detachably attached to the torque adapter 208.

Figure 5A:
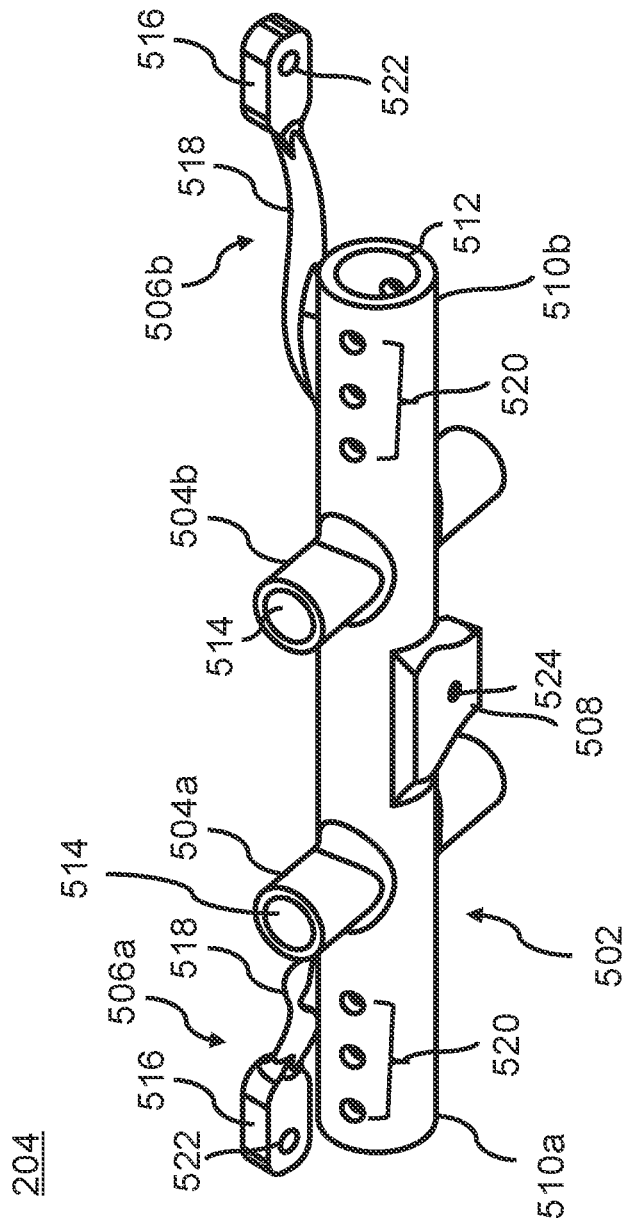
FIGS. 5A-5B depict a perspective view of a headrest adapter of a seat back, in accordance with one or more embodiments of the present disclosure.
Figure 5B:
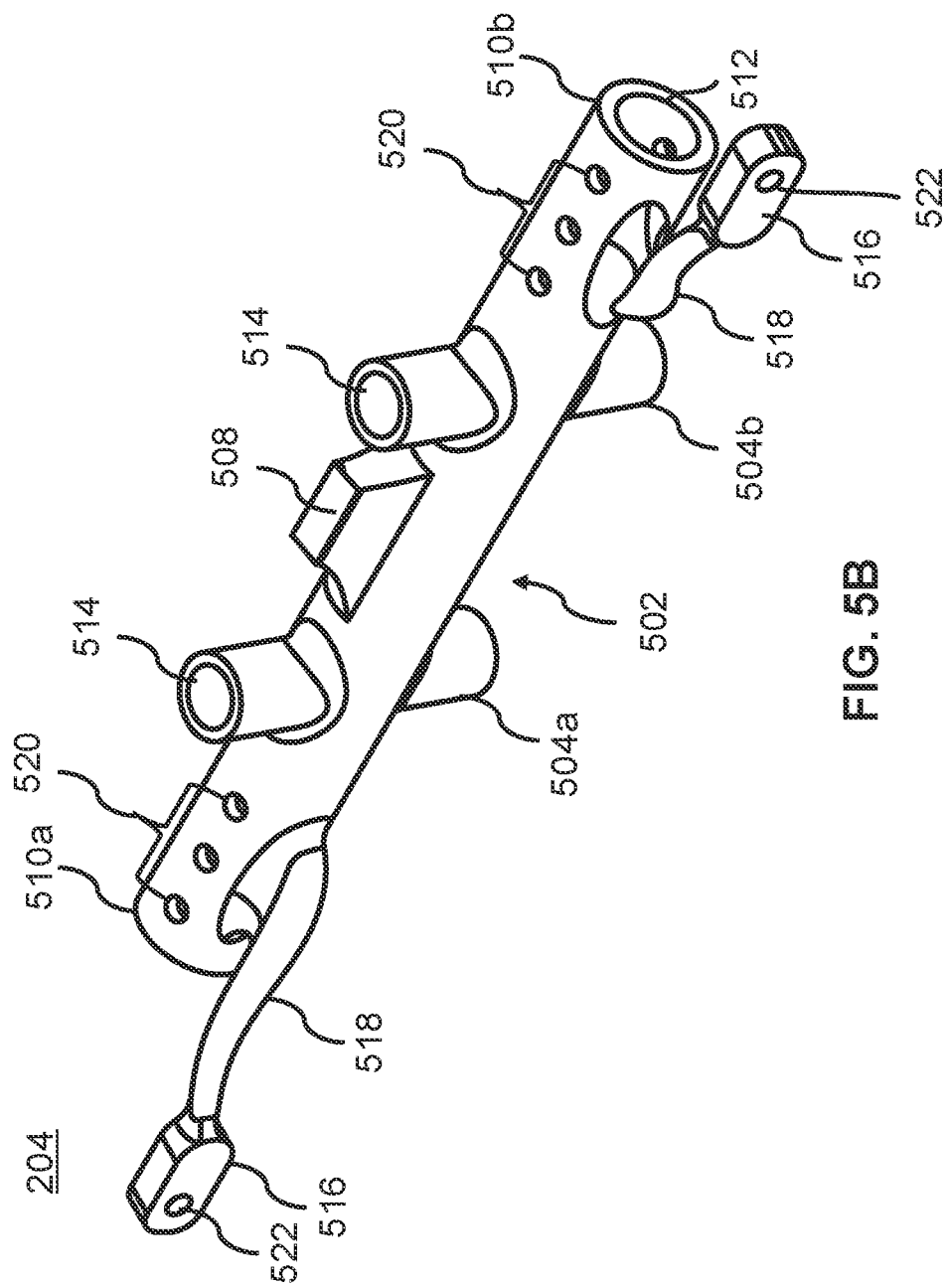

Referring now to FIGS. 5A-5B, the headrest adapter 204 is described, in accordance with one or more embodiments of the present disclosure. The headrest adapter 204 may include, but is not limited to, a tubular crossmember 502, ferrules 504, appendages 506, planar member 508

The headrest adapter 204 includes the tubular crossmember 502. The tubular crossmember 502 may also be referred to as a horizontal member. For example, the tubular crossmember 502 may be aligned in a horizontal orientation when the passenger seat 102 is installed in the aircraft 100. The tubular crossmember 502 spans between and couples the beam 202a to the beam 202b. The upper tubular members 404 of the beams 202a, 202b are received within and detachably attached to the tubular crossmember 502. In some embodiments, the tubular crossmember 502 is a round member with a circular cross-section.

The tubular crossmember 502 includes an end 510a and an end 510b. The end 510a and the end 510b each define a bore 512. The upper tubular member 404 of the beams 202a, 202b are received within the bores 512. For example, the upper tubular member 404 of the beam 202a is received within the bore 512 defined by the end 510a and the upper tubular member 404 of the beam 202b is received within the bore 512 defined by the end 510b. The upper tubular member 404 is also detachably attached to the ends 510a, 510b. The ends 510 defines a set of through holes 520. The through holes 520 receive a fastener detachably attaching the upper tubular member 404 to the ends 510. The set of through holes 520 may generally include two or more through holes. The two or more through holes may be desirable to enable a change in width of the seat back 104. As depicted, the set of through holes 520 include three of the through holes 520. For example, the ends 510 each define two or more through holes 520 for receiving the fastener to detachably attach the upper tubular member 404 of the beam 204a to the end 510a and to detachably attach the upper tubular member 404 of the beam 204b to the end 510b.

The headrest adapter 204 also includes ferrules 504. The ferrules 504 are vertical tubular members. The ferrules 504 are fixed to the tubular crossmember 502. The ferrules 504 are orthogonal to tubular crossmember 502. The ferrules 504 are disposed between the end 510 and the planar member 508. The ferrules 504 may receive a portion of the headrest 110. The ferrules 504 may each define a bore 512. The bore 512 may extend through the length of the ferrules 504. The bore 512 may receive the headrest 110. For example, the headrest 110 may include tubular members which are received within the ferrules 504. The ferrules 504 may guide the headrest 110 as a height of the headrest 110 is adjusted. A first portion of the headrest 110 is received within the ferrule 504a and a second portion of the headrest 110 is received within the ferrule 504b. For example, the headrest 110 includes a first tubular member received within the ferrule 504a and a second tubular member received within the ferrule 504b. In some embodiments, the ferrules 504b may be absent.

The headrest adapter 204 also includes appendages 506. The appendages 506 extend from the tubular crossmember 502. The appendage 506 may be a bracket between the tubular crossmember 502 and the back shell 210. The back shell 210 is detachably attached to the appendages 506. The appendages 506 include a plate 516 and an arm 518. As depicted, the headrest adapter 204 includes an appendage 506a and an appendage 506b.

The appendages 506 include the plate 516. The plate 516 couples the headrest adapter 204 to the back shell 210. The plate 516 may be a substantially flat surface or planar surface. The plate 516 may also be referred to as a face of the appendages 506. The plate 516 abuts the back shell 210 when the back shell 210 is attached to the headrest adapter 204. The plate 516 defines one or more through holes 522 for detachably attaching the back shell 210 to the headrest adapter 204.

The appendages 506 include the arm 518. The arm 518 extends between the tubular crossmember 502 and the plate 516. In some embodiments, the arm 518 may be an organic member created by generative design, as will be described further herein. The shape of the arm 518 is not intended to be limiting. The shape of the arm 518 may be adjusted to position the plate 516 abutting the back shell 210. The shape of the arm 518 may then be modified when the back shell 210 is changed.

The headrest adapter 204 also includes the planar member 508. The planar member 508 couples the headrest adapter 204 to the cover plate 206. The planar member 508 may be a substantially flat surface or planar surface. The planar member 508 may also be referred to as a face of the headrest adapter 204. The planar member 508 abuts the cover plate 206 when cover plate 206 is attached to the headrest adapter 204. The planer member 508 defines one or more holes 524 for detachably attaching the cover plate 206 to the headrest adapter 204. For example, the one or more holes 524 may be threaded blind holes.

The planar member 508 is fixed to the tubular crossmember 502. For example, the planar member 508 is fixed to the tubular crossmember 502 between the end 510a and the end 510b. By way of another example, the planar member 508 is fixed to the tubular crossmember 502 between the appendage 506a and the appendage 506b. By way of another example, the planar member 508 is fixed to the tubular crossmember 502 between the ferrule 504a and the ferrule 504b. By way of another example, the planar member 508 is fixed at a midpoint of the tubular crossmember 502.

The headrest adapter 204 may or may not define the cylindrical bore 512 through the length of tubular crossmember 502. For example, the ferrules 504 may be tubing inserted through holes in the tubular crossmember 502. In this regard, the ferrules 504 may block a portion of the interior of the cylindrical bore 512 defined by the tubular crossmember 502.

In some embodiments, the headrest adapter 204 may be considered to include one or more portions. For example, the headrest adapter 204 may include a primary load bearing portion and a secondary load bearing portion. The primary load bearing portion may also be referred to as a structural load-bearing portion. The secondary load bearing portion may also be referred to as a non-structural load-bearing portion. The primary load bearing portion may include the tubular crossmember 502, the ferrules 504, and the planar member 508. In this regard, the tubular crossmember 502, the ferrules 504, and the planar member 508 may be a portion of a weight of a passenger sitting on the passenger seat 102. The secondary load bearing portion may include the appendages 506. The primary load bearing portion may be isolated from the secondary load bearing portion. The structural load-bearing portion may allow the headrest adapter 204 to ensure structural integrity without recertification. The non-structural load-bearing portion may be redesigned to absorb last-minute change requests and customizations of the back shell 210. Advantageously, the non-structural load-bearing portion may be changed without recertifying the headrest adapter 204.

Figure 6:
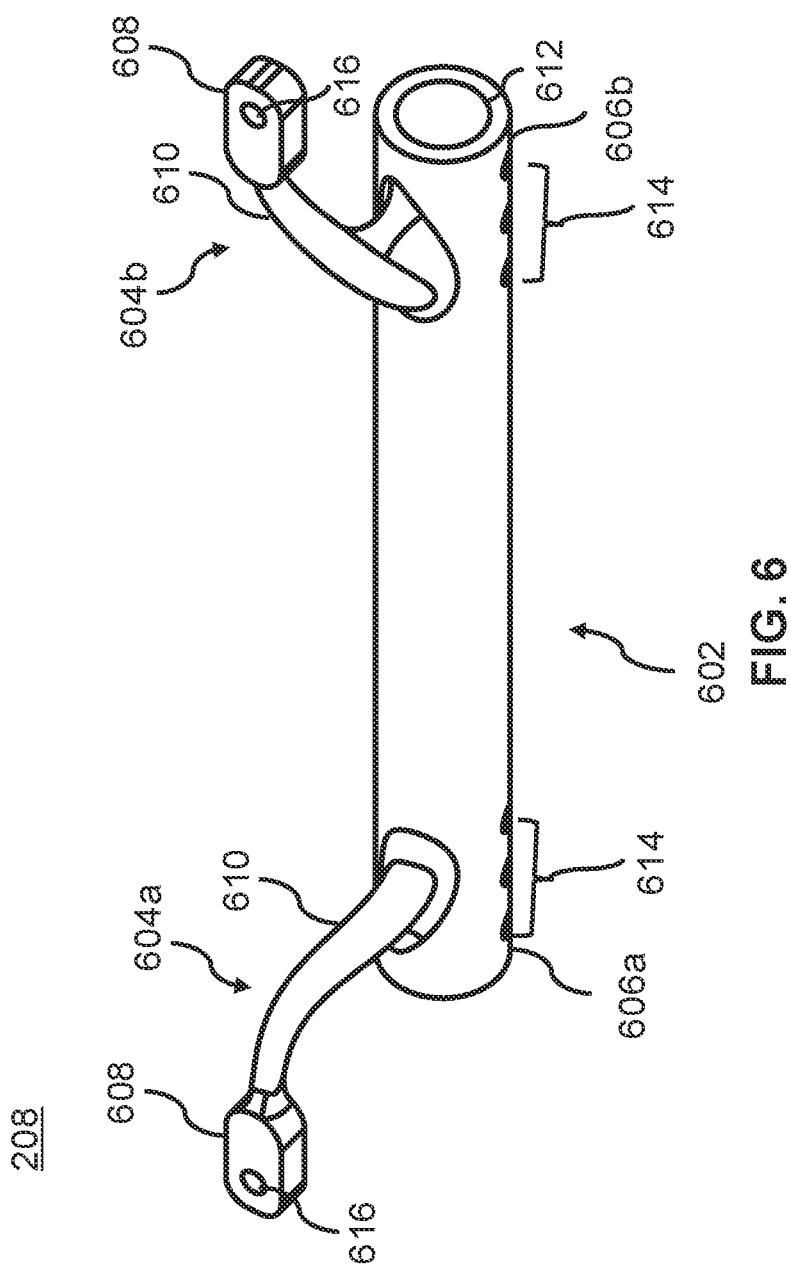
FIG. 6 depicts a perspective view of a torque adapter of a seat back, in accordance with one or more embodiments of the present disclosure.

Referring now to FIG. 6, the torque adapter 208 is described, in accordance with one or more embodiments of the present disclosure. The torque adapter 208 may be considered to include one or more portions, similar to the headrest adapter 204. The headrest adapter 208 may include, but is not limited to, a tubular crossmember 602 and appendages 604.

The torque adapter 208 includes the tubular crossmember 602. The tubular crossmember 602 may be similar to the tubular crossmember 502. The tubular crossmember 602 may also be referred to as a horizontal member. For example, the tubular crossmember 602 may be aligned in a horizontal orientation when the passenger seat 102 is installed in the aircraft 100. The tubular crossmember 602 spans between and couples the beam 202a to the beam 202b. The lower tubular members 406 of the beams 202a, 202b are received within and detachably attached to the tubular crossmember 602. In some embodiments, the tubular crossmember 602 is a round member with a circular cross-section.

The tubular crossmember 602 includes an end 606a and an end 606b. The end 606a and the end 606b each define a bore 612. The lower tubular member 406 of the beams 202a, 202b are received within the bores 612. For example, the lower tubular member 406 of the beam 202a is received within the bore 612 defined by the end 606a and the lower tubular member 406 of the beam 202b is received within the bore 612 defined by the end 606b. The lower tubular member 406 is also detachably attached to the ends 606. The ends 606 defines a set of through holes 614. The through holes 614 receive a fastener detachably attaching the lower tubular member 406 to the ends 606. The set of through holes 614 may generally include two or more through holes. The two or more through holes may be desirable to enable a change in width of the seat back 104. As depicted, the set of through holes 614 include three of the through holes 614. For example, the ends 606 each define two or more through holes 614 for receiving the fastener to detachably attach the lower tubular member 406 of the beam 204a to the end 606a and to detachably attach the lower tubular member 406 of the beam 204b to the end 606b.

The torque adapter 208 also includes appendages 604. The appendages 604 may be similar to the appendages 604. The appendages 604 extend from the tubular crossmember 602. The appendage 604 may be a bracket between the tubular crossmember 602 and the back shell 210. The back shell 210 is detachably attached to the torque adapter 208 by the appendages 506. The appendages 604 include a plate 608 and an arm 610. As depicted, the torque adapter 208 includes an appendage 604a and an appendage 604b.

The appendages 604 include the plate 608. The plate 608 couples the torque adapter 208 to the back shell 210. The plate 608 may be a substantially flat surface or planar surface. The plate 608 may also be referred to as a face of the appendages 604. The plate 608 abuts the back shell 210 when the back shell 210 is attached to the torque adapter 208. The plate 608 defines one or more through holes 616 for detachably attaching the back shell 210 to the torque adapter 208.

The appendages 604 include the arm 610. The arm 610 extends between the tubular crossmember 602 and the plate 608. In some embodiments, the arm 610 may be an organic member created by generative design, as will be described further herein. The shape of the arm 610 is not intended to be limiting. The shape of the arm 610 may be adjusted to position the plate 608 abutting the back shell 210. The shape of the arm 610 may then be modified when the back shell 210 is changed.

Referring generally again to FIGS. 1A-6.

It is contemplated that receiving the upper tubular member 404 within the tubular crossmember 502 may be desirable. For example, the appendages 506 may extend from the tubular crossmember 502 which may prevent the tubular crossmember 502 from being received within the upper tubular member 404. Similarly, it is contemplated that receiving the lower tubular member 406 within the tubular crossmember 602 may be desirable. For example, the appendages 604 may extend from the tubular crossmember 602 which may prevent the tubular crossmember 602 from being received within the lower tubular member 406.

Various tubular members have been described and depicted throughout the present disclosure. For example, the various tubular members may include but are not limited to tubular crossmembers, ferrules, and the like. Any of the various tubular members may include, but are not limited to, round tubular members, rectangular tubular members, and the like. Much of the present disclosure has depicted the tubular members as being round tubular members, although this is not intended to be limiting. The round tubular members may include a circular cross-section. The various tubular members may generally include a wall. The wall may include a wall thickness. The wall thickness may or may not vary along the length of the tubular member. The wall may define an interior bore within the tubular members. The interior bore may be defined along an axis of the tubular member. The interior bore may be defined along the axis through a length of the tubular member. For example, the interior bore may be defined along the axis through the entire length of the tubular member. By way of another example, the interior bore may be defined along the axis for a length less than the entire length of the tubular member. The length less than the entire length may be up to another interior surface. The length of the interior bore is not intended to be limiting. The interior bore may be beneficial to receive another member and/or to reduce a weight of the tubular member. The various tubular members may receive smaller tubular members within the interior bore. Similarly, the various tubular members may be received within a bore defined by larger tubular members. The various tubular members may be received within the bore by a fit. For example, the fit may include a clearance fit, a transition fit, or an interference fit.

In embodiments, the seat back 104 may include one or more fasteners (not depicted). The fasteners may attach and/or couple the various components. The fasteners may be inserted through one or more through holes. The fasteners may then mechanically join or affix the components. The fasteners may refer to non-permanent joints. In this regard, the fasteners may be detached and then the various components may be detached or uncoupled. As used herein, a detachable attachment or being detachably attached may refer to the fasteners coupling the various components. For example, the fasteners may be detached to change the cover plate 204 and/or the change the back shell 210. The fasteners may include any type of fastener. For example, the fasteners may include, but are not limited to, bolts, nuts, screws, pins, rivets, and the like.

A method of manufacturing the headrest adapter 204 is now described. As may be understood, the method is merely illustrative and is not intended to limit the headrest adapter 204. In embodiments, the headrest adapter 204 is manufactured by cutting a length of tubing to define the tubular crossmember 502. The through holes 520 for coupling the tubular crossmember 502 to the beams 202 are cut in the ends 510. The through holes for the ferrules 504 are also cut in the tubular crossmember 502. Tubing is cut to length to define the ferrules 504. The ferrules 504 are then inserted into the through holes for the ferrules 504 defined by the tubular crossmember 502. The ferrules 504 are then welded to the tubular crossmember 502. For example, the tubular crossmember 502 and the ferrules 504 may each be formed of aluminum tubing, or the like. A blank of metal may be machined to define the planar member 508. The planar member 508 may then be welded to the tubular crossmember 502. For example, the planar member 508 may be formed from a blank of aluminum. The appendages 506 may then be formed onto the tubular crossmember 502. For example, the appendages 506 may be formed onto the tubular crossmember 502 by an additive manufacturing process. It is further contemplated that the headrest adapter 204 may be made of composite.

As depicted, the seat back 104 includes two adapters, such as the headrest adapter 204 and torque adapter 208. It is further contemplated the seat back 104 may include more than two adapters (not depicted). For example, the seat back 104 may include two or more of the headrest adapter 204 and one or more of the torque adapters 208. By way of another example, the seat back 104 may include one or more of the headrest adapters 204 and two or more of the torque adapters 208.

In embodiments, the headrest adapter 204 may be symmetric. In embodiments, the torque adapter 208 may be symmetric. The headrest adapter 204 and/or the torque adapter 208 may be symmetric about an axis. The axis may be midway through the adapters. The headrest adapter 204 and/or the torque adapter 208 may be symmetrical to ensure the passenger seat 102 and the seat back 104 looks symmetrical in a forward-facing configuration and an aft-facing configuration. For example, the passenger seat 102 and the seat back 104 may be used in either of the forward-facing configuration or the an aft-facing configuration depending upon the seating configuration in the aircraft 100. The symmetry of the headrest adapter 204 and/or the torque adapter 208 may also reduce a part count between forward-facing configurations and aft-facing configurations.

Although the side member 402 of the beams 202 are depicted as being substantially planar along the length of the side members, this is not intended to be limiting. The beams 202 and/or the side members 402 may be topology optimized. The topology optimization may refer to eliminating portions of the side member 402 which experience the least amount of stress. The topology optimization may reduce the weight of the beams 202 and the side members 402. For example, the side members 402 may generally include an I-shaped cross-section (not depicted). The I-shaped cross-section may be defined between a front flange, a web, and a rear flange. The flanges may extend along the sides of the side members 402. The web may connect between the flanges. The web may include a width less than a width of the flanges. In this regard, the substantially planar portion of the side member 402 may be removed to define the web. The side members 402 may also include one or more reinforcing segments. The reinforcing segments connect between the flanges. The reinforcing segments may include a width substantially equal to the width of the flanges. The reinforcing segments may be added to transfer stress between the flanges.

In embodiments, the appendages 506 and/or the appendages 604 include arms which are organic members. The appendages may be generated by tools using generative design. The appendages depicted have been generated by the generative design. The appendages include an organic shape. The organic shape depicted is arbitrary and should not be considered limiting. The constraints on the appendage and/or the input to the generative design tool may include a position of the appendage on the tubular crossmember, a position of the plate (e.g., a position of the plate for coupling to the back shell 210), an expected load the appendage experiences from the back shell 210, a fastener interface on the plate (e.g., a location of the through holes), and the like Any of the various components described herein may be made from a material. The material may include, but is not limited to, a composite, aluminum, a material which is additively manufactured and the like.

In embodiments, the back shell 210 may include one or more zones (not depicted) for attaching to the headrest adapter 204 and to the torque adapter 208. The zones in the back shell 210 may be defined by holes in the back shell 210. For example, the back shell 210 may include one or more inserts bonded onto the back shell 210. The inserts may define the one or more holes. The pre-defined zones may be locations where the plates 516 and the plates 608 extend towards and detachable attach to the back shell 210. Shape variation in the back shell 210 may be accommodated for by adjusting the placement of the plates 516 and the plates 608 (e.g., by adjusting the arms 518 and the arms 610). In this regard, the headrest adapter 204 and to the torque adapter 208 have provisions for building the seat back 104 with different widths. Multiple seat families may then be rapidly built by adjusting the arms. The appendages grab onto the back shell 210 in the pre-defined space. The back shells 210 may thus include standardized zones, making the primary load-bearing portion adapters immune to changes and/or variations due to the various factors mentioned before.

Although much of the present disclosure is directed to the seat back 104, this is not intended as a limitation of the present disclosure. It is further contemplated that the use of the organic arms may be modified onto existing seat backs. The appendages may be designed to extend the plates for coupling the seat back to a back shell. In existing products and designs (where there are cross-members in place of the headrest adapters 204 and torque adapter 208), the appendages themselves can be individually designed (using generative design techniques) and thus can help standardize the attachments of the back shell 210.

It is noted that where the passenger seat 102 is installed within the aircraft 100, the passenger seat 102 may be configured in accordance with aviation guidelines and/or standards put forth by, but not limited to: the Federal Aviation Administration (FAA), the European Aviation Safety Agency (EASA), or any other flight certification agency or organization; the American National Standards Institute (ANSI) or any other standards setting organization or company; and the like.

Although much of the present disclosure is directed to the passenger seat 102 being installed within the aircraft 100 or aircraft cabin, it is noted herein the passenger seat 102 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A passenger seat comprising:
    a headrest;
    a seat pan; and
    a seat back comprising:
        a first beam and a second beam; wherein the first beam comprises a first side member, a first upper tubular member, and a first lower tubular member; wherein the first upper tubular member and the first lower tubular member extend perpendicular from the first side member; wherein the second beam comprises a second side member, a second upper tubular member, and a second lower tubular member; wherein the second upper tubular member and the second lower tubular member extend perpendicular from the second side member;
        a headrest adapter; wherein the headrest adapter spans between and couples the first beam to the second beam; wherein the headrest adapter is detachably attached to the first beam and to the second beam; wherein the first upper tubular member and the second upper tubular member are received within and detachably attached to the headrest adapter;
        a torque adapter; wherein the torque adapter spans between and couples the first beam to the second beam; wherein the torque adapter is detachably attached to the first beam and to the second beam; wherein the first lower tubular member and the second lower tubular member are received within and detachably attached to the torque adapter;
        a back shell; wherein the back shell is detachably attached to the headrest adapter and to the torque adapter; and
        a cover plate; wherein the cover plate is detachably attached to the first beam, the second beam, and the headrest adapter.

2. The passenger seat of claim 1, wherein the headrest adapter comprises a tubular crossmember; wherein the tubular crossmember spans between and couples the first beam to the second beam; wherein the first upper tubular member and the second upper tubular member are received within and detachably attached to the tubular crossmember of the headrest adapter.

3. The passenger seat of claim 2, wherein the tubular crossmember is a round member with a circular cross-section.

4. The passenger seat of claim 2, wherein the tubular crossmember comprises:
    a first end; wherein the first end defines a first bore; wherein the first upper tubular member is received within the first bore and is detachably attached to the first end; and
    a second end; wherein the second end defines a second bore; wherein the second upper tubular member is received within the second bore and detachably attached to the second end.

5. The passenger seat of claim 4, wherein the first end defines a first set of two or more through holes receiving a first fastener detachably attaching the first upper tubular member to the first end;
    wherein the second end defines a second set of two or more through holes for receiving a second fastener detachably attaching the second upper tubular member to the second end.

6. The passenger seat of claim 2, wherein the headrest adapter comprises a first appendage and a second appendage; wherein the first appendage and the second appendage extend from the tubular crossmember; wherein the back shell is detachably attached to the first appendage, the second appendage, and the torque adapter.

7. The passenger seat of claim 6, wherein the first appendage comprises a first plate and a first arm; wherein the first arm couples the first plate and the tubular crossmember; wherein the back shell is detachably attached to the first plate.

8. The passenger seat of claim 2, wherein the headrest adapter comprises a first ferrule and a second ferrule; wherein a first portion of the headrest is received within the first ferrule; wherein a second portion of the headrest is received within the second ferrule.

9. The passenger seat of claim 1, wherein the first beam and the second beam cause rotation of the seat back about a pivot point.

10. The passenger seat of claim 1, wherein the first beam and the second beam are aligned in a vertical orientation when the passenger seat is in an upright position.

11. The passenger seat of claim 1, wherein the back shell is a covering on an aft of the seat back.

12. The passenger seat of claim 1, wherein the headrest adapter is disposed above the torque adapter when the passenger seat is in an upright position.

13. A seat back comprising:
    a first beam and a second beam; wherein the first beam comprises a first side member, a first upper tubular member, and a first lower tubular member; wherein the first upper tubular member and the first lower tubular member extend perpendicular from the first side member; wherein the second beam comprises a second side member, a second upper tubular member, and a second lower tubular member; wherein the second upper tubular member and the second lower tubular member extend perpendicular from the second side member;
- a headrest adapter; wherein the headrest adapter spans between and couples the first beam to the second beam; wherein the headrest adapter is detachably attached to the first beam and to the second beam; wherein the first upper tubular member and the second upper tubular member are received within and detachably attached to the headrest adapter;
- a torque adapter; wherein the torque adapter spans between and couples the first beam to the second beam; wherein the torque adapter is detachably attached to the first beam and to the second beam; wherein the first lower tubular member and the second lower tubular member are received within and detachably attached to the torque adapter;
- a back shell; wherein the back shell is detachably attached to the headrest adapter and to the torque adapter; and
- a cover plate; wherein the cover plate is detachably attached to the first beam, the second beam, and the headrest adapter.

* * * * *